INVENTOR.
George J. Heberlein
ATTORNEY

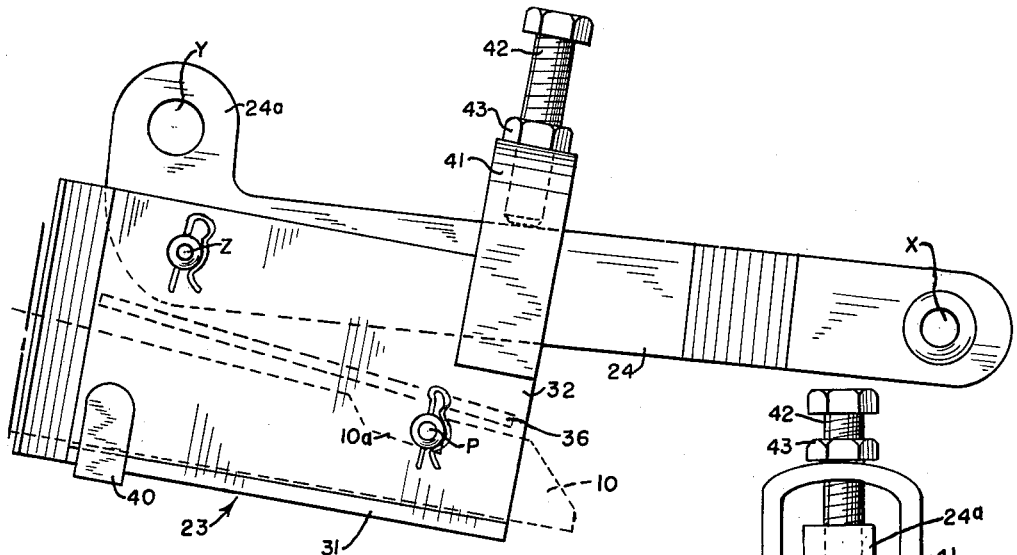
Fig. 3
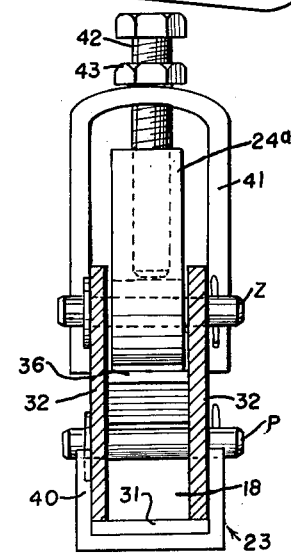
Fig. 5
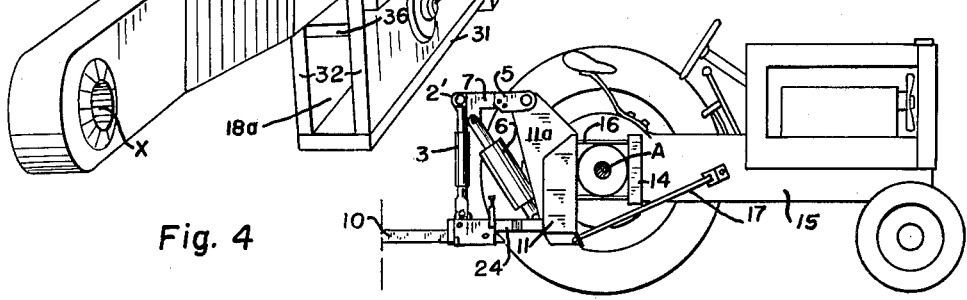
Fig. 4
Fig. 6
INVENTOR.
George J. Heberlein
BY
ATTORNEY

United States Patent Office 3,029,880
Patented Apr. 17, 1962

3,029,880
FAST HITCH ADAPTER FOR TRACTOR LIFT
George J. Heberlein, 220 1st Ave., Ault, Colo.
Filed June 27, 1960, Ser. No. 39,035
4 Claims. (Cl. 172—272)

This invention relates to farm machinery, and, more particularly, to hitches between a tractor and an implement being pulled thereby, and where the latter has a tongue or draw bar that is lifted, substantially horizontally, by the tractor at the beginning and end of each row or of the field, wherein the farm work with the implement is being performed. In modern farm implement machinery, those hitches are single, dual or commonly called three-point hitches, and, while I illustrate this preferred embodiment of my invention in use with a three-point hitch, it is to be understood that it may be used with more or less number of hitch points. It will be further understood that modern farm implement machinery is designed whereby a raising of the tongue or drawbar thereof, and which is done not by a pivot point at its front, but by a holding of that tongue longitudinally of its prolonged axis in its entirety and at the same time thus raising it in a constant arc, to thereby effect a tumbling of the plow implement, in such raising operation, or to effect a lifting of the cultivator, drill, cutter, or whatever the implement be which is being pulled by and behind the tractor, and which tractor effects such raising. It has been a problem, therefore, to have a way of effecting a hitch of the tongue or drawbar of different implements, to the plural hitch point hydraulic lift of the tractor, as each implement, due to its inherent design and function, requires a slightly different angle to the horizontal of the holding and lifting of its tongue or drawbar. To overcome that difficulty, I have perfected a new fast hitch adapter capable of being used for effecting the hitch connection of different type farm implements, each requiring a different angle to the horizontal for pulling, holding and lifting of its tongue, with the hydraulic lifting mechanism of a tractor.

It is a principal object of my invention to provide a fast hitch adapter, for a tractor having a hydraulic lift connection point for attachment to the tongue of any implement to be pulled and lifted thereby, comprising a rigid lifting bar pivoted at its front end, a novel implement draw-bar adapter housing pivoted at its rear to the rear of the lifting bar, a latch-pivot means in the housing for floatingly pivotally securing the implement draw-bar tongue therein, and adjustable stop means carried by the housing for limiting its pivotal movement on the lifting bar.

Another object is the provision of such a fast hitch adapter whereby such pivot-latch tongue holding means permits a limited up and down pivoted floating movement of the tongue, during such holding and pulling thereby.

Another object is the provision of a lift and torque resistor means, for a tractor having such lift mechanism mounted on its rear axle, connecting the mechanism also directly to the tractor housing, to relieve the rear axle housing of the tractor of the entire torque lifting and pulling stress, during use.

Other and further objects will be apparent to those skilled in the art from the following detailed explanation, and from the accompanying drawings, in which:

FIGURE 1 is a perspective partial view of a conventional three-point hydraulic hitch 1, but having my fast hitch adapter 23 as a part thereof, for attachment to the rear axle A and housing 15 of a tractor;

FIGURE 2 is an enlarged side view of my adapter 23;

FIGURE 3 is a similar view to that of FIGURE 2, but with a different position of bolt 42 thereof, showing how same affects the pivotal adjustment of the housing 31—32 on its pivot point Z, for varying the angle of the longitudinal axis of draw-bar 10 to the horizontal, from that as shown in FIGURE 2;

FIGURE 4 is an end perspective view of my fast hitch adapter, looking in the direction indicated by arrow 4 of FIGURE 2;

FIGURE 5 is a left end view of my adapter, partially cross-sectional, taken on the line 5—5 and in direction of arrows, shown in FIGURE 2; and FIGURE 6 is a reduced diagrammatical view of a tractor having a lift of type described, with my fast hitch adapter thereon, and with my pull and lifter torque resistor elements 17 shown thereon.

Figure 1:
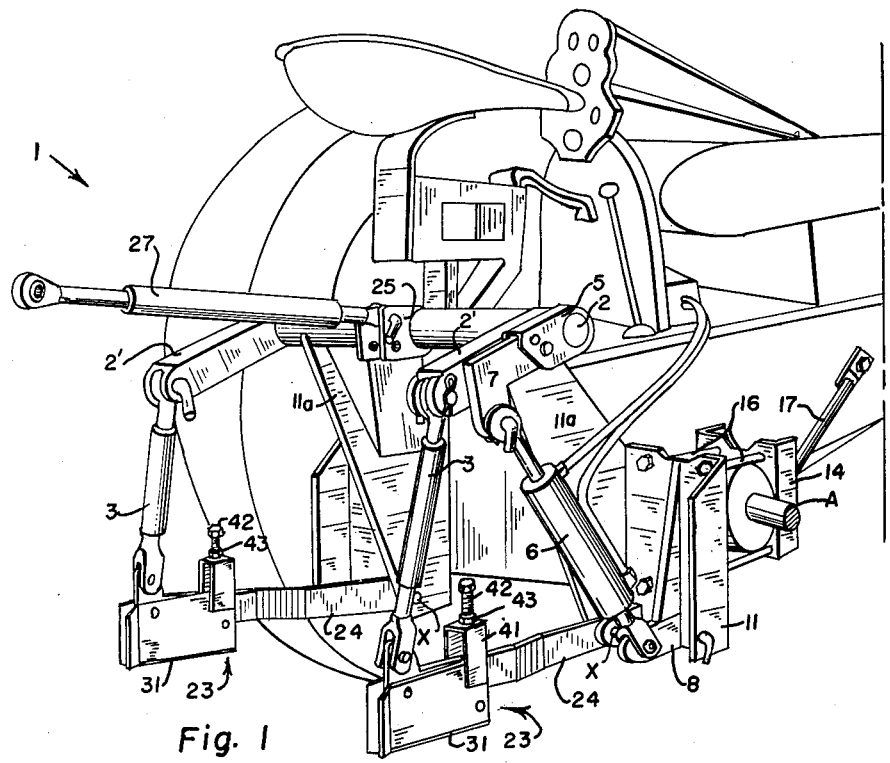

Referring to FIGURE 1 of the drawings, 1 generally indicates a three-point hitch attachment for attachment to the rear axle A of a tractor. Opposing pairs of axle supporting brackets 11 and 14, as shown, are suitably secured to each side of the rear axle, as by bolts 16 as illustrated, for carrying the hitch mechanism on and by that axle. Heretofore, as far as known, the load and torque thereof were entirely carried by that axle, resulting in radial twisting of the mechanism and axle thereon during use. To overcome that, in my novel attachment, I use a pair of rigid pull and lifting torque resistor braces 17, from under the rear axle A, to and between the lift mechanism axle brackets 14 and the rear center housing shell of the tractor 15, whereby the wracking tension of that torque is largely carried directly by the tractor housing, and not by the rear axle, as that torque, with some implements lifted by the lifted mechanism 1, and pulled thereby, is equivalent of a ton. It will be noted, in FIGURE 1, that rear bracket 11 is U-shaped, with inner higher flanges 11a, to the upper parts of which is suitably journalled therebetween a rotatable U-shaped yoke 2. The projections 2' of 2 are for purpose, on rotation of 2 clockwise, of effecting a lifting as 2 is so rotated. Secured to rotatable yoke shaft 2 is a shorter stub bracket 25, so that when 2 is rotated, that moves with it. Stub bracket 25 is adapted to have an adjustable turn-buckle arm 27 pivotally secured by one of its ends thereto, and the other end of 27 has a ball-socket for comprising the third point hitch connection point, as will be explained. Bracket 25 is shorter than 2', and parallel therewith, for a reason to be explained. There is also an inverted U-shaped bracket 5 keyed to arm 2, as illustrated, to rotate therewith, and under and within 5, as shown, a right angle lifter bar 7 is loosely secured onto rotatable shaft 2. A projection 8, at the lower part and rearwardly extending of bracket 11, is provided to comprise a journal, for the mounting of one end of a double acting pneumatic cylinder 6. The other end of said pneumatic cylinder 6 is secured to crank outer end of lifter bar 7, and it will be readily seen, that upon action of the double acting pneumatic cylinder 6, pushing in both directions at the same time, that an upward force will be thereby exerted upon 7, and thereby in turn under and upon 5, and by the latter the shaft 2 will be caused to rotate clockwise for arc raising of arms 2' of the yoke 2, for reason to be explained further. To the lower portions of the inner flanges of each axle bracket 11, I suitably pivotally mount, at point X, one end of my novel fast hitch adapter lifting and pulling arm 24 by a loose socket pivot or ball connection therewith, by any suitable means. My arm 24 is the novel shape shown in FIGURE 2, having an upwardly extending crank portion 24a, with the latter having a hole Y therethrough. I provide a pair of the lifting arms 24, of equal length, each positioned and pivotally mounted to a bracket 11, in alignment with each other and in alignment under its adjacent stub 2', for providing a two point lower lifting hitch thereby, as will be explained. There is a pair of equal length adjustable turn-buckle pivotally connected lifting rods 3, each connecting an outwardly rearwardly extending end of a stub 2' by one of its ends, and the lower aligned rearwardly extending end of my novel lifter arms 24 at point Y by the other of its ends, as by suitable pivot bolts, as illustrated. It will be apparent that, by a lifting of pivot stubs 2', which are interconnected to rise in unison, each lifting rod 3, being pivotally connected at its lower end at point Y with its adjacent lifter arm 24, will pivotally raise lifter arm 24 on latter's pivot point X. It will be noted that this just described hydraulic operated lifting mechanism, generally designated as 1, comprises, among others, a like pair of pivotally mounted equal parallelograms, for reason to be explained. I have thus far explained a conventional three-point hydraulically operated hitch, having my torque-resistor braces 17 and except by changing the conventional straight bar lifting and pulling bar or arm 24 to one of my design, for reason now to be explained. Farm implements, such as a tumble or other plow, a cultivator, or any other of several, are connected to the rear end Y of the lifter and puller bar 24 of the hitch, and there is a different angle to the horizontal, of the longitudinal axis of that tongue, in the start of lifting operation of that tongue, required for efficient and normal operation of the implement, by the lifting mechanism. I will now explain how my fast hitch adapter attachment will be capable of adjustment to meet any variation of that angle for different implements, without having to have a separate hitch adapter for each of the many different farm implements now being used and operated by a tractor hydraulic lift mechanism.

Figure 2:
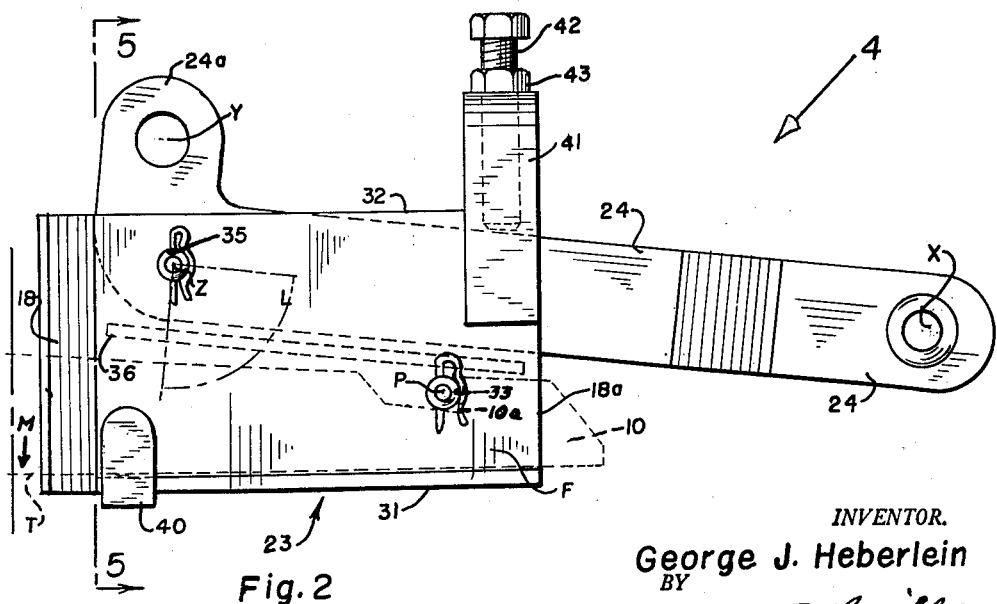

First it is to be understood that each farm implement usually today has a uniform size, shape and design rigid tongue draw bar, partially indicated as 10 of FIGURES 2, 3 and 6, and which is slightly forwardly tapered, of substantially rectangular cross-sectional shape, and has, adjacent its front taper, a depressed notch or latch catch portion 10a. Also, to be understood, is that the lifting or raising operation of the farm implement, by its tongue drawbar 10, requires a complete lifting and raising of the entire implement by its tongue, in effect, by a slight pole-vault raising of the entire and extremely heavy implement by its tongue, by the lift mechanism. By slight, is meant the implement is so raised about a foot out of and above the ground plane, at least. I have heretofore spoken of the angle of the longitudinal axis of the tongue to the horizontal, and by that expression I have meant, for normal pulling operation of the implement by the tongue and, therefore, at the start of the lifting operation thereof. It will thus be seen that that lifting operation, by the lifting mechanism, is a small arc raising of the entire implement, by the tongue, on point X of my novel attachment.

I provide a housing 23 as the main part of my fast hitch adapter, of substantial steel material, comprising spaced apart parallel walls 32, having a substantial steel floor 31 welded thereto, and a divider steel partition 36 positioned and welded therebetween to the walls and substantially midway from top to bottom of the walls with the divider slightly slanting, as shown in FIGURES 2, 4 and 5. I pivotally hang the housing 23 on my lifter arm 24, at a point thereon just below the pivot connection Y of crank end thereof with lifting rod 3, by providing aligned holes 35 in the upper left portion of the walls 32 and a like hole at that point of the arm 24, and inserting and keying a slightly smaller pivot bolt Z therethrough. The bolt Z is conventionally held therein by a washer welded to one of its outer ends and a removable cotter key being inserted therethrough at its other outer end, as illustrated. Substantially at the pivot point Z end of the housing 23, I weld a steel reinforcing strap 40 from one side of the outside of one wall and under the floor 31 and to the outside of the other wall 32, as the down torque of the lifted implement, during lifting operation, is at that point. I weld a strong steel inverted U-shape yoke strap 41, spaced above and across the walls 32, to walls 32, at the other end of the housing 23 from its pivot end Z. I form a hole in the upper arch center of 41 and internally thread it to receive therein a strong stud screw bolt 42, as illustrated. Between the head of bolt 42 and the top of 41, I place a lock screw-nut 43. Slightly below divider wall 36 of housing 23, near strap 41 end of 23, I provide a sizeable aligned pair of openings 33 through each wall 32, and I insert another pin designated as P, of substantial strength and slightly smaller than those openings, through those openings. The pin P is removably held in that latter opening 33, by having a washer welded to one of its outer ends and a removable cotter key inserted conventionally through its other outer end, as illustrated. The open end of the housing 23 is indicated as 18, under 36 and between walls 32 and above floor 31, through which the tongue drawbar 10 of the implement is inserted, when pin P has been removed. The other end of the housing 23 is indicated as 18a, through which the tongue 10 protrudes, after the pin P has been reinserted into openings 33 and fixedly held in place therewithin the notch 10a of the tongue drawbar as shown in FIG. 3. It will be noted that divider partition 36 is welded to walls 32, as illustrated, with its front, or right end as shown in FIGURE 2, closer to the floor 31 of the housing 23 than its rear or left end as shown in FIGURE 2. The additional space, between said left end of the divider plate 36 and the adjacent end of floor 31, over that of its other end is for a reason to be explained.

I refer to the open end of the housing 23, at the left, as illustrated in FIGURE 2, or its rear tongue-insert tube-like receiving end, between the walls 32 and below plate 36 and above floor 31, as tongue-receiver space 18; and I refer to the other end, below 36, between walls 32 and above the floor 31, as tongue-holder end 18a. It will be seen, that when the implement tongue or drawbar 10 is inserted, from the rear of the housing 23 to its front, or from the left to the right as illustrated in FIGURE 2, between walls 32, above floor 31 and below divider plate 36, to the position as shown therein in dotted lines, and the pin P has been inserted through its aligned holes 33, and keyed in place, through the tongue notch and against its holder edge 10a, as illustrated, that a pulling of the tractor, to which lifting and pulling arm 24 is attached, will be transmitted through the housing 23; the housing is held against pivoting on its pivot Z during such pulling by yoke 41 and bolt 42, by the latter having its lower end screw-seated down against the upper surface of 24, by the arm 24, to the pulling bolt P, and, the bolt P being against 10a, and 10 being confined between 36 and 31 at that end 18a, the pulling is transmitted through pin P against 10a, thereby to tongue drawbar 10. There is a pivoted pulling of the tongue drawbar 10, by pin P, at tongue-holder end 18a of housing 23, by edge 10a abutting pin P, and permitting up and down motion of the tongue 10, at that pivot point, and as permitted by the extra space at tongue-receiver space end 18 of the housing, due to a greater space at that end 18 between that end of divider plate 36 and that end of floor plate 31 than at end 18a, as illustrated by FIGURE 2. During pulling by the tractor, the up and down slight pivotal movement of the tongue 10, on P, just explained, is a very important resultant floating action of the tongue, for efficient implement operation on uneven ground, which is the reason I place the divider plate slanting downwardly from back to front of the housing 23, or from left to right as illustrated in FIGURE 2, and spaced as it is from floor 31 a greater distance at tongue-receiver end 18 of 23 than the height of tongue 10, as shown.

Referring to FIGURE 2, during hydraulic lifting operation of lifting arm 24 by lifter rod 3, when arm 24 is pivotally thereby raised on its point X, housing 23 is lifted by pivot bolt Z and is held against counter-clockwise rotation on Z, due to the down-weight exerted at M of the implement being lifted by 10, and due to the front end of drawbar 10 pressing upwardly against under side of plate 36 at 18a end of the housing, and both of which cause the upper 18a end of plate 36 to press upwardly against the under side of arm 24, with the latter acting as a stop to prevent such counter-clockwise rotation of 23 on Z, and thus the entire implement is raised by its tongue drawbar 10 by my fast hitch adapter. The distance between 18a end of my divider plate 36 and the lower surface of the adjacent portion of my lifter arm 24 controls the extent of such counter-clockwise pivotal arc movement L, in that direction, on pivot point Z during such lifting operation of the hydraulic hitch, during the implement lifting operation just explained. It is also to be noted, during pulling operation of the implement of the tongue 10, the amount of the tongue drawbar 10 floating up and down pivotal movement, over uneven ground, in addition to reason therefor heretofore explained, is also controlled by that space between 18a end of 36 and the under side of lifting arm 24. It will be readily seen that such floating is permitted by the housing 23 pivoting on its pivot Z, and as limited by the combined spaces between underside of 24 and its adjacent 18a end of 36, on the one hand, and by the space above 24, and as may be in any setting of bolt 42, and between the lower end of bolt 24 and that upper surface of adjacent 24, on the other hand. It is also to be noted, upon inserting tongue drawbar 10 into the receiving end 18 of my housing 23, when the angle of the tongue requires it to be normally inserted and held for pulling operation in a more downwardly angle than as illustrated in FIGURE 2, the bolt 42 of yoke 41 is unscrewed, thereby permitting my housing 23 to be manually moved clockwise on its pivot Z from the position shown in FIGURE 2, and as illustrated in FIGURE 3, and then when the tongue is fully inserted, and pin P replaced and keyed, the bolt 42 is screwed in until its lower end normally seats on top of arm 24, as illustrated in FIGURE 2, but at the new angle from FIGURE 3, for the desired proper longitudinal axis of 10 positioning for efficient functional farm operation of the implement to be pulled by its tongue 10 by my adapters 23 the required resultant depth in the ground. To restate, while each implement has operational adjustments for controlling its operational depth in the ground, as it is pulled by its tongue drawbar 10, those controls are ineffectual unless the implement's tongue drawbar 10 is held and pulled at the right angle to the horizontal; and that proper angular holding and pulling position of tongue 10 of an implement, during its operation, is one of the things that my novel fast hitch adapter invention accomplishes, for any one of varied implements, in any one of different needed angular positioning thereof, by its novel plural pivotal and adjustable and plate 36 construction just fully explained. A screwing of bolt 42 into 41, with its lower end against the upper edge of 24, causes housing 23 to pivot counter-clockwise on Z until the upper edge of 18a end of 36 abuts the under side of 24; and, as previously explained, an unscrewing of that bolt permits of a clockwise pivoting of housing 23 on Z; arm 24 is, for those purposes, constantly held in a fixed position. I have found, for the average farm implement, upon insertion of the tongue drawbar 10 into 18—18a of my housing 23, most efficient operation results by adjusting my adapter by the setting of bolt 42 as illustrated in FIGURE 2, with a little space between the underside of arm 24, at end 18a, and the upper end of divider 36, for reason explained heretofore.

It will be seen that my novel fast hitch adapter, 24-Z-32-31-36-P-42-41, as designed, constructed, disclosed and explained, comprises a novel plural pivoted, adjustable adapter floating latch means.

Double acting hydraulic cylinder 6 is of conventional design, and is operated from a hydraulic master cylinder of the tractor, and is operationally controlled by the driver of the tractor.

Stub arm 25, of the third point hitch is conventional, to have a functional operation of a part of the farm implement being pulled by lifting and pulling arms 24; it being understood that arms 24 operate to do the pulling and lifting through my novel adapters 23. While I have shown and described one such of my arms 24, and its adapter 23, as lifted by lifting rod 3, it will be understood that there can be a plurality of such on any plural hitch, as shown and illustrated by FIGURES 1 and 6; plural hitches are used where like dual implements are operated by the tractor; there is one adapter 24—23 for each lifter rod 3, and they are independent of each other, except that they are operated in unison by the master lifting mechanism 1, which is, as illustrated, a parallelogram lifting mechanism.

Having thus explained in detail this preferred embodiment of my invention, it will be seen by those skilled in the art that many changes and modifications may be made therein without deviating from the teaching, disclosure, and scope of my invention, and, therefore, I wish to be bound only by the hereunto appended claims.

What I claim and desire to secure by Letters Patent is:

1. In combination with a hydraulically operated lifting hitch mechanism for a tractor, a fast hitch adapter for the hitch point thereof comprising, a pivoted lifting and pulling bar having a front and a rear end and adapted to be pivoted at the forward end thereof to and to be pivotally raised by the mechanism at the other end thereof, an implement drawbar receiving and holding fast hitch adapter housing pivotally secured to and carried by the lifting bar adjacent its other end, means carried by the lifting bar for effecting said pivoting of the housing to the lifting and pulling bar other end, stop means carried by the housing for limiting its pivoting on the lifting and pulling bar in one direction, adjustable stop means carried by the housing and adapted to abut the lifting and pulling bar for limiting the pivoting of the housing on the other end of the lifting and pulling bar in the other direction, and removable draw-bar latch pivot means carried by the housing and adapted for effecting a pivotal-latch floating hitch connection of the implement drawbar therewith and therein.

2. A plural pivoted fast hitch adapter for a hydraulic lift for a tractor, comprising, in combination, an elongated lifting bar having front and rear ends and adapted to be pivoted at its front end at a fixed point to the hydraulic lift mechanism and to be pivotally raised by a pivot connection at its rear end by said mechanism and on said front end, an elongated adapter housing having side walls and a floor and an open top and a divider plate centrally thereof and extending between said walls and with the space between the divider plate and the floor comprising an implement drawbar receiving portion, said housing being pivotally connected with and carried by the rear end of the lifting bar and at the one end of the housing above its divider plate, means for effecting said housing pivoting to the lifting bar including a pin extending between said housing walls and with one of said walls on each side of said bar, a pivot latch pin removably extending through and between said walls below said divider plate and at the end of the housing remote from the pivotal connection of the housing with the lifting bar and comprising pivotal implement draw-bar latch holding means for holding such drawbar within the housing drawbar receiving portion, the space between the divider plate and the floor being sufficient to permit the drawbar on its pivot latch-holding pin means to have limited up and down floating movement thereon during tractor pulling operation, and a yoke means extending upwardly and over said lifting bar and from wall to wall of the housing and adapted for limiting the pivoting of the housing in one direction on the lifting bar and being positioned at the housing end remote from its pivotal connection with the lifting bar, said yoke having an adjustable screw stud bolt means at the yoke center and being adapted to have its non-head end abut the surface of the lifting bar on certain screw seating of that bolt, said divider plate being adapted for limiting the housing pivoting in the other direction.

3. A fast hitch adapter for a tractor pulling lift comprising, in combination, a rigid lifter arm having two ends and pivoted to a tractor at one of its ends, an implement drawbar adapter receiver housing pivoted to the lifter arm adjacent its other end and having an implement drawbar latch-pivot holding means therein, said housing being adapted to latch-pivotally-hold the front end of an implement drawbar therein by said latch-pivot means and to permit the drawbar to floatingly pivot up and down within the housing on such latch-pivot means, pivot means carried by the arm and adapted for pivoting the housing to the arm other end, and adjustable stop means carried by the housing and adapted for adjustably abutting the lifter arm and adapted for limiting the implement drawbar floating pivot movement in one direction on said latch-pivot means within said adapter housing by a limiting of the adapter housing pivoting in that direction on its pivot on the lifter arm.

4. A fast hitch adapter combination as defined in the preceding claim, and characterized further by the definition of the adapter housing having four walls comprising two side walls and an upper and a lower wall, and with the upper and the lower wall being spaced apart sufficiently a greater distance than and with relation to the vertical thickness of the implement drawbar to permit the drawbar to floating pivot in the housing and on the latch-pivot means a limited up and down pivotal amount therebetween at all times during pulling of the implement by the drawbar by its latch-pivot.

References Cited in the file of this patent

UNITED STATES PATENTS

| | | |
|---|---|---|
| 1,464,740 | Benjamin et al. | Aug. 14, 1923 |
| 2,673,508 | Richey | Mar. 30, 1954 |
| 2,834,277 | Tanke | May 13, 1958 |
| 2,874,789 | Hershman | Feb. 24, 1959 |
| 2,959,233 | Scarlett et al. | Nov. 8, 1960 |

FOREIGN PATENTS

| | | |
|---|---|---|
| 173,878 | Austria | Feb. 10, 1953 |
| 584,136 | Canada | Sept. 29, 1959 |
| 1,201,608 | France | July 15, 1959 |